United States Patent [19]
Kusano et al.

[11] Patent Number: 5,093,547
[45] Date of Patent: Mar. 3, 1992

[54] METHOD OF WELDING BETWEEN A ROTOR AND A SHAFT AND A DEVICE FOR THE METHOD

[75] Inventors: Toshikuni Kusano; Makoto Okabayashi; Masami Ishii; Toshiro Kawakami, all of Aichi, Japan

[73] Assignee: Aisin Seiki Kabushiki Kaisha, Japan

[21] Appl. No.: 501,524

[22] Filed: Mar. 28, 1990

[30] Foreign Application Priority Data

Mar. 28, 1989 [JP] Japan .................................. 1-077690

[51] Int. Cl.⁵ .............................................. B23K 11/10
[52] U.S. Cl. .................................. 219/91.2; 219/78.13
[58] Field of Search ........................... 219/91.2, 78.13

[56] References Cited
U.S. PATENT DOCUMENTS

| | | | |
|---|---|---|---|
| 443,748 | 12/1890 | Dewey | 219/78.13 |
| 2,623,975 | 12/1952 | Watrous, Jr. | 219/78.13 |

Primary Examiner—Marvin M. Lateef
Attorney, Agent, or Firm—Banner, Birch, McKie & Beckett

[57] ABSTRACT

Welding between a rotor and shaft is accomplished by first placing the shaft within a movable holder of a pressure device. The rotor is then placed in the lower or stationary holder of the pressure device. Each holder is an electrode that can electrify the shaft and rotor. The stationary holder is a cup or container which has inside the cup, a low melting point alloy which conducts electricity from the lower electrode to the rotor to prevent concentration of electricity. Welding is finished by lowering the shaft onto the rotor which is in the cup which is heated to liquefy the low melting point alloy. As the shaft and rotor are pressed together, current is passed through each by the electrodes. The junction of the shaft and rotor are melted and thus joined. After cooling, any of the low melting point metal which remains on the rotor is removed by inserting the rotor in boiling water.

18 Claims, 3 Drawing Sheets

METHOD OF WELDING BETWEEN A ROTOR AND A SHAFT AND A DEVICE FOR THE METHOD

BACKGROUND OF THE INVENTION

1. Field of the Invention

The present invention relates to a method of welding between a rotor and a shaft and a device for the method, and more particularly to a method of welding between a rotor and a shaft for a turbocharger and a device for the method.

2. Description of the Related Art

A conventional method of welding between a rotor and a shaft related to the present invention is disclosed in Japanese Laid-Open Patent Application No. 60(1985)-118394, published on June 25, 1985. There the method is called condenser-type resistance welding. A device 70 for the method is shown in FIG. 1. In FIG. 1, a shaft 71 of a turbocharger (not shown) is fixed to an upper electrode 72. A rotor 73 of the turbocharger is fixed to a lower electrode 74. The shaft 71 is made of heatproof steel and the rotor 73 is made of heatproof alloy. Both the upper electrode 72 and the lower electrode 74 are connected to a power source (not shown) which comprises a condenser. The shaft 71 comprises a connecting-end 71a. The rotor 73 comprises a center-boss 73a and a connecting face 73b.

The lower electrode 74 is fixed to a stationary holder (not shown). The upper electrode 72 is fixed to a movable holder (not shown). The shaft 71 is pressed down to the rotor 73 by the movable holder.

The shaft 71 and the rotor 73 are welded under the conditions that the charging voltage of the condenser is at 250-300 V, the pressing force of the movable holder is 800-1000 kgf and the time is about 10 seconds. Thus, a connecting portion 75 between the connecting-end 71a and the connecting face 73b is heated up to 1300 degrees centigrade.

Consequently, the shaft 71 and the rotor 73 are welded by the heating and the pressing force.

In the above-mentioned method, electric flux is concentrated at the connecting portion 75, the center-boss 73a and so on. Namely, electric flux is concentrated at a contact portion that different members contact each other at a small area. Since the electric flux and the pressing force are concentrated at the area of the center-boss 73a, there is a possibility that the center-boss 73a is softened and damaged.

SUMMARY OF THE INVENTION

Accordingly, it is a primary object of the present invention to prevent concentrating of electric flux to portions except for the welded portion.

The above and other objects are achieved according to the present invention by a method of welding between a rotor and a shaft comprising the steps of fixing a shaft having a finished connecting portion to an upper electrode which is fixed to a movable holder, fixing a rotor having a finished connecting portion to a lower electrode which is fixed to a stationary holder and which is formed like a container or cup, melting a low melting point alloy, which has a melting point lower than the boiling point of water in the lower electrode by a heater, pressing down the shaft to the rotor with connecting portions of each of the shaft and rotor opposing each other, connecting the shaft electrically to a power source via an outer circumferential portion thereof, connecting the rotor electrically to the power source via the low melting point alloy, and removing the low melting point alloy adhering on the rotor by immersing the rotor into boiling water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
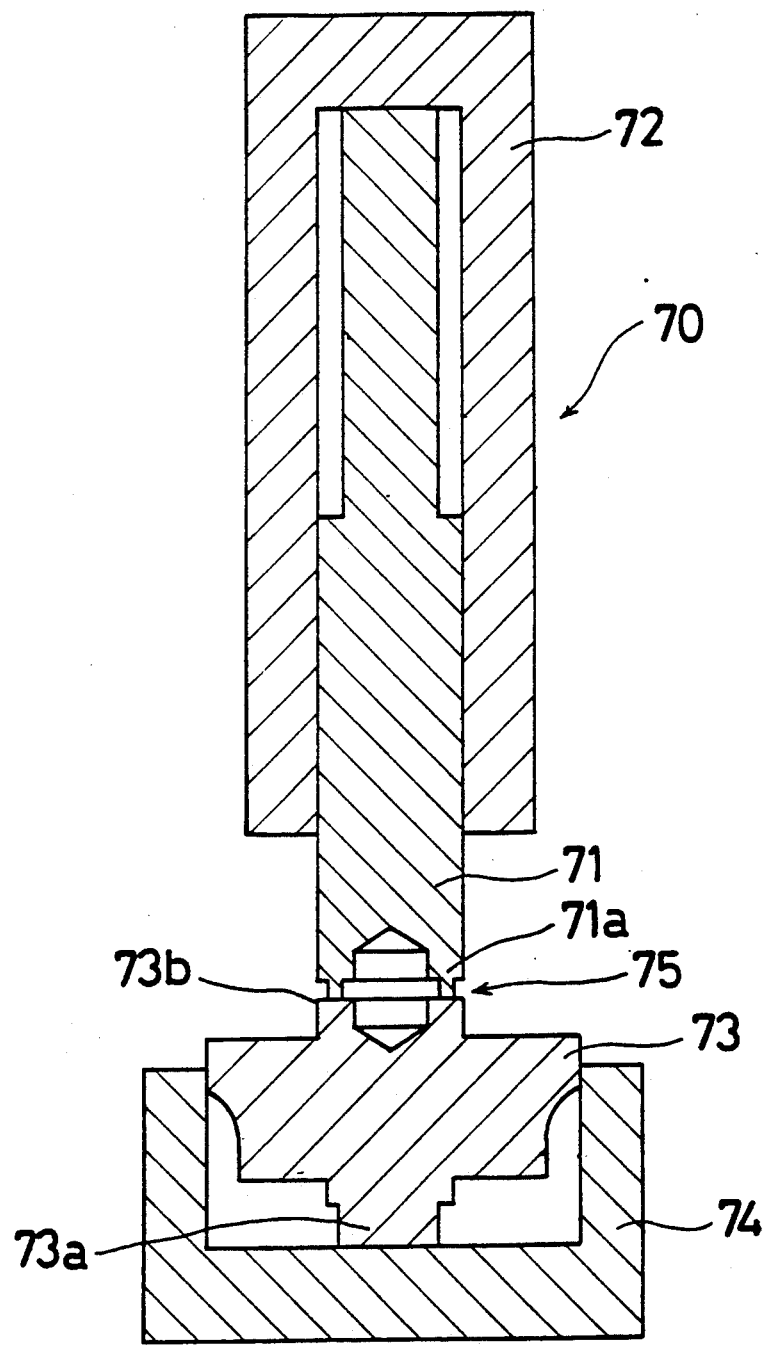
FIG. 1 is cross-sectional view of a conventional device for a method of welding between a rotor and a shaft.
Figure 2:
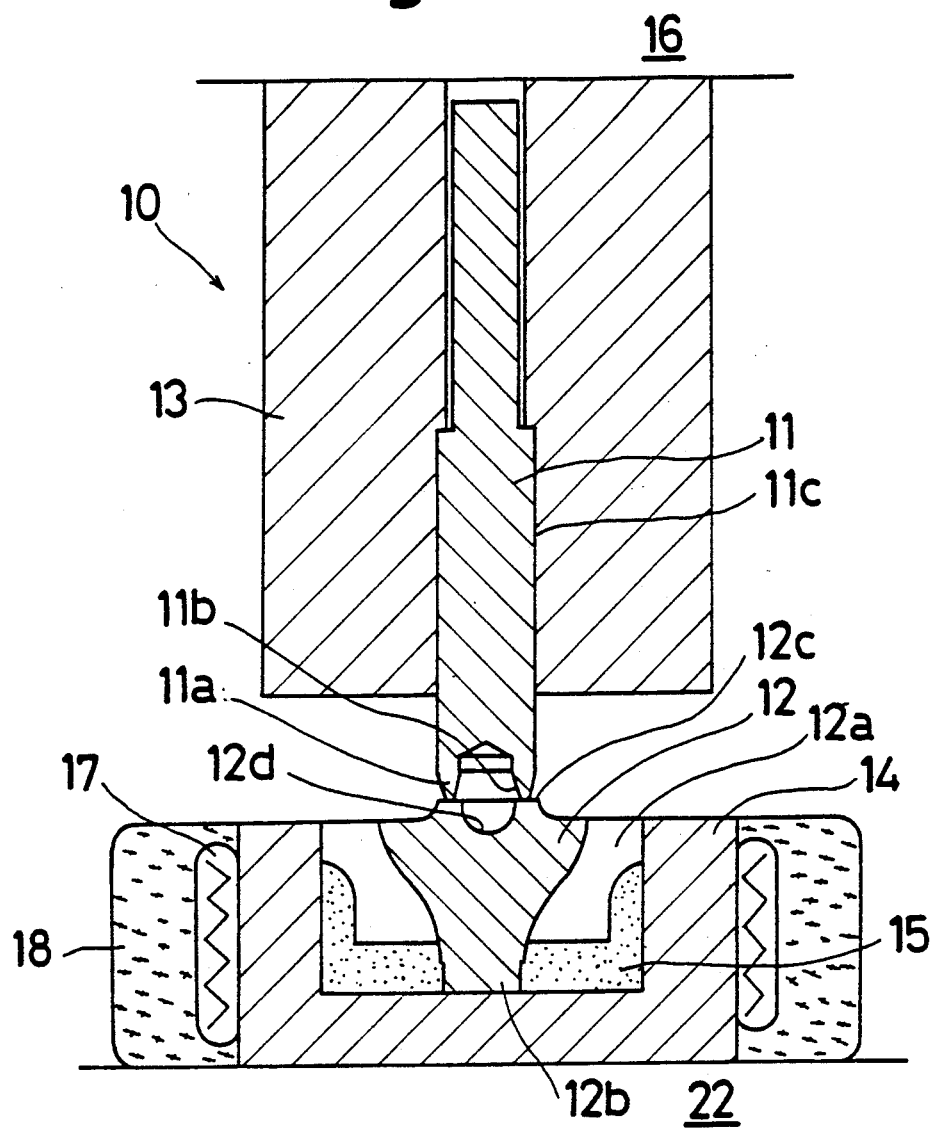
FIG. 2 is a cross-sectional view of a conventional device for a method of welding between a rotor and a shaft in which the present invention is employed.
Figure 3:
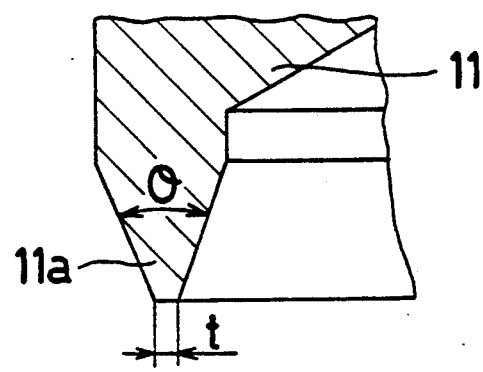
FIG. 3 is a cross-sectional view of a portion of a shaft according to the invention.

In FIGS. 2 and 3 a device 10 for a method of welding between a rotor 12 and a shaft 11 is shown and both of the shaft 11 and the rotor 12 are finished. A connecting portion 11a of the shaft 11 is formed into a ring-shape which has a width "t" and an opening angle "$\theta$". The shaft 11 has a depression 11b. The rotor 12 has blades 12a, a center-boss 12b, a connecting portion 12c and a depression 12d. The connecting portion 12c is formed into a plane. The shaft 11 is made of steel-alloy and the rotor 12 is made of heatproof alloy.

An outer circumferential portion 11c of the shaft 11 is supported to an upper electrode 13 which is fixed to a movable holder 16. The upper electrode 13 is electrically connected to a power source for welding (not shown). The holder 16 is fixed to a pressure device (not shown).

The blades 12a and the center-boss 12b of the rotor 12 are supported to a lower electrode 14 which is fixed to a stationary holder 22 and which is formed like a container or cup. The lower electrode 14 is electrically connected to the power source for welding. A heater 17 and a heat insulator 18 is located around the lower electrode 14. The heater 17 is electrically connected to a power source for heating (not shown).

A low melting point alloy 15 is contained within lower electrode 14. Heater 17 is used to melt low melting point alloy 15. Thus, the rotor 12 is electrically connected via the blades 12a, the center-boss 12b and the low melting point alloy 15.

The shaft 11 is pressed down to the rotor 12 by the pressure device, at this time, the connecting portion 11a of the shaft 11 is contacted to the connecting portion 12c. Next, electric current for welding is applied to the shaft 11 and the rotor 12 by the power the low melting point alloy 15. After welding, any of the low melting point alloy 15 which is adhering to the melting alloy 15. After welding, the melting alloy 15 adhered on the rotor 12 is removed by immersing the rotor 12 into boiling water. Therefore, the shaft 11 is welded with the rotor 12. Further, the electric flux or flow extends across the surface of rotor 12 because of low melting point alloy 15.

A method of welding according to the foregoing method and device is described hereinafter as an experimental example. The preferred conditions of welding are as follows:

The composition of the steel-alloy of the shaft 11 is Ni-Cr-Mo-steel;

The composition of the heatproof alloy of the rotor 12 is Ni-radical-alloy;

The width "t" is 0.3 mm;

The opening angle "$\theta$" is a 60-degree angle;

The pressure of the pressure device is 500 kgf;

The electric current value for welding is 11.5 kA;

The time of passing electrical current for welding is 0.2 second;

The melting point of the low melting point alloy 15 is 80 degrees centigrade;

The composition of the melting alloy 15 is 44.2 wt % Bi-24.8 wt % Pb-18.5 wt % In-12.5 wt % Sn; and The type of resistance welding is A.C.-type resistance welding.

After welding, the welding member of the shaft 11 and the rotor 12 is tested by rotating it at 250,000 revolution/minute. As a result, the welding member is not damaged. Next, the welding member is a tested on the tensile strength by comparing it with the welding or connecting member welded or connected by other methods. Table 1 presents the result of the test.

TABLE 1

| connecting method | the tensile strength |
|---|---|
| electron beam weld | 4400 kg |
| friction welding | 4800 kg |
| resistance welding | 4700 kg |

Therefore, the welding member according to the invention has no problem for practical use.

The embodiment has at least the following advantages.

The shaft 11 is in contact with a large area of the upper electrode 13, and the rotor 12 is in contact with lower electrode 14 over a large area due to the melted low melting point alloy so that electric flux or flow of electricity is not concentrated except for at the connecting portion 11a and 12c. Thus, except for the connecting portions 11a and 12c the remainder of the shaft and rotor are not softened and damaged.

Figure 4:
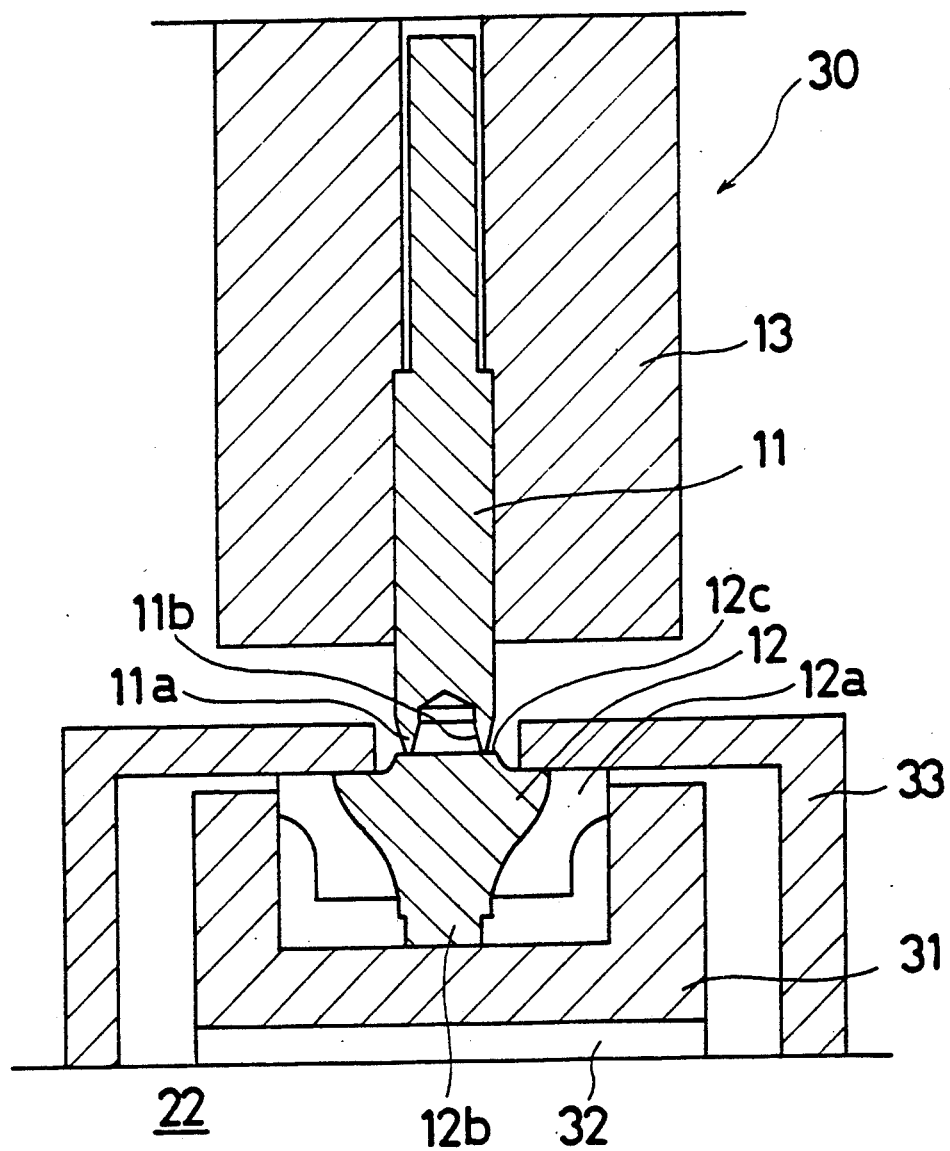
FIG. 4 is a view similar to FIG. 2, however, showing another embodiment according to the invention.

Next, FIG. 4 shows a device 30 for a method of welding between a rotor 12 and a shaft 11 of a second embodiment according to the present invention. The differences from the first embodiment will be described hereinafter:

A clamp 31 is fixed to the stationary holder 22 via an electric insulator 32. The rotor 12 is supported by the clamp 31. A lower electrode 33 is connected or electrically connected to the stationary holder 22. The lower electrode 33 is connected or electrically connected to the rotor 12 via the blades 12a.

The shaft 11 is pressed down on to the rotor 12 by the pressure device. At this time, the connecting portion 11a of the shaft 11 is contacted to the connecting portion 12c. Next, electric current for welding is applied to the shaft 11 and the rotor 12 by the power source for welding via the outer circumferential portion 11c and via the blades 12a. Therefore, the shaft 11 is welded with the rotor 12.

A method of welding according to the foregoing method and device is described hereinafter as an experimental example.

The preferred conditions of welding are as follows:

The composition of the steel-alloy of the shaft 11 is Ni-Cr-Mo-steel;

The composition of the heatproof alloy of the rotor 12 is Ni-radical-alloy;

The width "t" is 0.3 mm;

The opening angle "$\theta$" is 90-degree angle;

The pressure of the pressure device is 500 kgf;

The electric current value for welding is 11.5 kA;

The time of passing electrical current for welding is 0.2 second; and

The type of resistance welding is A.C.-type resistance welding.

Note, the melting alloy 15 is not used in the second embodiment.

The many advantages listed above are also realized according to the second embodiment of this invention. In addition, the pressing force is not applied at the blades 12a. Therefore, even though the electric flux concentrates at the blades and this area is softened, the blades are not damaged.

It is preferred that the connecting portion 11a of the shaft 11 is formed into a ring-shape and the connecting portion 12c of the rotor 12 is formed into a plane in the above-mentioned embodiments. However, it is no problem if the connecting portion 11a of the shaft 11 is formed into a plane and the connecting portion 12c of the rotor 12 is formed into a ring-shape.

Obviously, numerous modifications and variations of the present invention are possible in light of the above teachings. It is, therefore, to be understood that within the scope of the appended claims, the invention may be practiced otherwise than as specifically described herein.

We claim:

1. A method of welding between a rotor and a shaft, comprising the steps of:
    attaching one end of said shaft to a movable holder and an electrode connected to a source of electric power;
    placing said rotor within a stationary cup shaped holder which is an electrode connected to said source of electric power;
    melting a low melting point alloy which is contained within said stationary holder;
    moving said movable holder and said shaft such that the other end of said shaft contacts and presses against said rotor;
    supplying electricity to said electrodes thereby causing said other end of said shaft and said rotor to be heated and welded together; and
    removing said shaft and said rotor from said stationary holder.

2. A method of welding between a rotor and a shaft as set forth in claim 1, wherein the rotor is made of the heatproof alloy, and the composition of the heatproof alloy is Ni-radical-alloy.

3. A method of welding between a rotor and a shaft as set forth in claim 1, wherein the shaft is made of the steel alloy, and the composition of the steel-alloy is Ni-Cr-Mo-steel.

4. A method of welding between a rotor and a shaft as set forth in claim 1, wherein the melting point of said low melting point alloy is 80 degrees centrigrade, and the composition of said low melting point alloy is 44.2 wt % Bi-24.8 wt % Pb-18.5 wt % In-12.5 wt % Sn.

5. A method of welding between a rotor and a shaft as set forth in claim 1, further comprising the step of placing said rotor within boiling water to remove any of the low melting point alloy which adheres to said rotor.

6. A method of welding between a rotor and a shaft as set forth in claim 5 wherein said other end of said shaft is ring shaped having a width "t" and an opening angle "$\theta$", and said rotor has a planar surface where said other end of said shaft contacts said rotor.

7. A method of welding between a rotor and a shaft as set forth in claim 6 wherein the width "t" is 0.3 mm and the opening angle "$\theta$" is a 60 degree angle.

8. A method of welding between a rotor and a shaft as set forth in claim 5 wherein said other end of said shaft has a planar surface and said rotor is ring shaped having a width "t" and an opening angle "$\theta$" where said other end of said shaft contacts said rotor.

9. A method of welding between a rotor and a shaft as set forth in claim 8 wherein the width "t" is 0.3 mm and the opening angle "$\theta$" is a 90 degree angle.

10. A method of welding between a rotor and a shaft as set forth in claim 1 wherein said other end of said shaft is ring shaped having a width "t" and an opening angle "$\theta$", and said rotor has a planar surface where said other end of said shaft contacts said rotor.

11. A method of welding between a rotor and a shaft as set forth in claim 10 wherein the width "t" is 0.3 mm and the opening angle "$\theta$" is a 60 degree angle.

12. A method of welding between a rotor and a shaft as set forth in claim 1 wherein said other end of said shaft has a planar surface and said rotor is ring shaped having a width "t" and an opening angle "$\theta$" where said other end of said shaft contacts said rotor.

13. A method of welding between a rotor and a shaft as set forth in claim 12 wherein the width "t" is 0.3 mm and the opening angle "$\theta$" is a 90 degree angle.

14. A method of welding between a rotor and a shaft, comprising the steps of:
    attaching one end of said shaft to a movable holder and and electrode connected to a source of electric power;
    placing said rotor within a stationary cup shaped holder which is an electrode;
    clamping said rotor within said stationary holder;
    moving said movable holder and said shaft, such that the other end of said shaft contacts and presses against said rotor; and
    supplying electricity to said electrodes thereby causing said other end of said shaft and said rotor to be heated and welded together.

15. A method of welding between a rotor and a shaft as set forth in claim 14 wherein the shaft is made of the steel alloy, and the composition of the steel-alloy is Ni-Cr-Mo-steel.

16. A method of welding between a rotor and a shaft as set forth in claim 14, wherein the rotor is made of the heatproof alloy, and the composition of the heatproof alloy is Ni-radical-alloy.

17. A device for welding two objects together comprising:
    a first movable electrode for holding a first one of said objects;
    a second stationary cup shaped electrode for holding a second one of said objects;
    a source of electric power connected to said electrodes;
    a low melting point alloy positioned in said second electrode; and
    a heater positioned about said second electrode for melting said low melting point alloy, such that said second object is in electrical contact with said second electrode and said low melting point alloy such that the electric flux is spread across the surface of said second object when said first and second objects are welded together by pressure and electricity.

18. A device for welding two objects together comprising:
    a first movable electrode for holding a first one of said objects;
    a second stationary cup shaped electrode for holding a second one of said objects, said second electrode including a clamp for holding said second object within said second electrode; and
    a source of electric power connected to said electrodes for supplying electricity to said electrodes such that when said objects are brought together, said objects are welded by pressure and electricity, with said clamp distributing the electric flux across the surface of said second object.

* * * * *